US012567086B2

(12) United States Patent (10) Patent No.: US 12,567,086 B2

McFaddin et al. (45) **Date of Patent: *Mar. 3, 2026**

(54) DYNAMICALLY UPDATED ADVERTISEMENT PLACEMENTS IN SEQUENTIAL WORKFLOWS

(71) Applicant: International Business Machines Corporation, Armonk, NY (US)

(72) Inventors: Herbert Scott McFaddin, Yorktown Heights, NY (US); Chandrasekhar Narayanaswami, Wilton, CT (US)

(73) Assignee: International Business Machines Corporation, Armonk, NY (US)

( * ) Notice: Subject to any disclaimer, the term of this patent is extended or adjusted under 35 U.S.C. 154(b) by 69 days.

This patent is subject to a terminal disclaimer.

(21) Appl. No.: 17/550,211

(22) Filed: Dec. 14, 2021

(65) Prior Publication Data

US 2023/0186344 A1 Jun. 15, 2023

(51) Int. Cl.
| | |
|---|---|
| *G06Q 30/0242* | (2023.01) |
| *G06Q 30/0217* | (2023.01) |
| *G06Q 30/0241* | (2023.01) |

(52) U.S. Cl.
CPC ..... *G06Q 30/0246* (2013.01); *G06Q 30/0217* (2013.01); *G06Q 30/0277* (2013.01)

(58) Field of Classification Search
None
See application file for complete search history.

(56) References Cited

U.S. PATENT DOCUMENTS

| | | | |
|---|---|---|---|
| 8,065,176 B2 | 11/2011 | Facciorusso | |
| 8,108,257 B2 | 1/2012 | Sengamedu | |
| 8,666,807 B1 | 3/2014 | Murray | |

(Continued)

FOREIGN PATENT DOCUMENTS

| | | |
|---|---|---|
| CN | 101796536 A | 8/2010 |
| CN | 108416610 A | 8/2018 |

(Continued)

OTHER PUBLICATIONS

Mell, et al., "The NIST Definition of Cloud Computing," Recommendations of the National Institute of Standards and Technology, U.S. Department of Commerce, Special Publication 800-145, Sep. 2011, 7 pgs.

(Continued)

*Primary Examiner* — Mathew Syrowik

(74) *Attorney, Agent, or Firm* — Heather Schuler

(57) ABSTRACT

A system may include a memory and a processor in communication with the memory. The processor may be configured to perform operations. The operations may include engaging a user in a primary activity; the primary activity may include a plurality of stages. The operations may include compiling at least one risk-reward score for an advertisement placement of an advertisement for at least one of the plurality of stages. The operations may include updating, dynamically, the at least one risk-reward score and identifying a recommended stage for the at least one advertisement; the recommended stage may be based on the risk-reward score. The operations may include displaying the at least one advertisement to the user at the recommended stage.

20 Claims, 11 Drawing Sheets

(56) References Cited

U.S. PATENT DOCUMENTS

| | | | |
|---|---|---|---|
| 8,799,062 | B1 | 8/2014 | Epperson |
| 9,204,205 | B1 | 12/2015 | Pasula |
| 9,571,542 | B2 | 2/2017 | Navok |
| 9,769,539 | B2 | 9/2017 | Bhogal |
| 10,410,258 | B2 | 9/2019 | Denton |
| 10,643,240 | B2 | 5/2020 | Burger |
| 11,010,788 | B1* | 5/2021 | Haynes .............. G06Q 30/0276 |
| 11,223,864 | B1* | 1/2022 | Malik .................. H04N 21/252 |
| 11,386,454 | B1* | 7/2022 | Ripper .............. G06Q 30/0247 |
| 2002/0072972 | A1 | 6/2002 | Lamont |
| 2006/0253437 | A1 | 11/2006 | Fain |
| 2008/0059295 | A1 | 3/2008 | Schauser |
| 2008/0154708 | A1* | 6/2008 | Allan ....................... G07G 1/01 |
| | | | 705/14.23 |
| 2008/0222283 | A1 | 9/2008 | Ertugrul |
| 2008/0270355 | A1 | 10/2008 | Patel |
| 2008/0300909 | A1 | 12/2008 | Rikhtverchik |
| 2008/0320394 | A1 | 12/2008 | Womack |
| 2009/0070206 | A1 | 3/2009 | Sengamedu |
| 2009/0079871 | A1* | 3/2009 | Hua ..................... H04N 21/854 |
| | | | 348/584 |
| 2009/0106081 | A1* | 4/2009 | Burgess ............. G06Q 30/0277 |
| | | | 705/14.73 |
| 2010/0185674 | A1 | 7/2010 | Jobs |
| 2011/0040612 | A1 | 2/2011 | Simmons |
| 2011/0087548 | A1 | 4/2011 | Schauser |
| 2012/0036429 | A1 | 2/2012 | Ajima |
| 2013/0066665 | A1 | 3/2013 | Tamhane |
| 2013/0290480 | A1 | 10/2013 | Manion |
| 2014/0278987 | A1 | 9/2014 | Busch |
| 2015/0039443 | A1* | 2/2015 | Soon-Shiong ..... G06Q 30/0269 |
| | | | 705/14.66 |
| 2015/0100894 | A1 | 4/2015 | Kumar |
| 2015/0242901 | A1 | 8/2015 | Losey |
| 2015/0310494 | A1* | 10/2015 | Goldberg ........... G06Q 30/0276 |
| | | | 705/14.64 |
| 2015/0379584 | A1 | 12/2015 | Trachtenberg |
| 2016/0239867 | A1* | 8/2016 | Sinha ................. G06Q 30/0257 |
| 2016/0292732 | A1* | 10/2016 | Kang .................. G06Q 30/0226 |
| 2017/0140428 | A1* | 5/2017 | Chakraborty ...... G06Q 30/0269 |
| 2017/0148056 | A1* | 5/2017 | Hata .................. G06Q 30/0277 |
| 2017/0148057 | A1 | 5/2017 | Parameshwar |
| 2017/0337505 | A1* | 11/2017 | Chittilappilly ......... G06N 20/00 |
| 2017/0372350 | A1* | 12/2017 | Duggal .............. G06Q 30/0244 |
| 2018/0300748 | A1* | 10/2018 | Flaks ................. G06Q 30/0243 |
| 2018/0343484 | A1 | 11/2018 | Loheide |
| 2019/0259058 | A1* | 8/2019 | Chakraborty .......... H04L 51/52 |
| 2020/0413139 | A1 | 12/2020 | Ickin |
| 2021/0006849 | A1 | 1/2021 | Stern |
| 2021/0035163 | A1 | 2/2021 | Peris |
| 2021/0049622 | A1 | 2/2021 | He |
| 2021/0097110 | A1* | 4/2021 | Asthana ........... G06F 16/90332 |
| 2021/0110431 | A1 | 4/2021 | Frank |
| 2021/0295364 | A1 | 9/2021 | Veettil |
| 2021/0306718 | A1 | 9/2021 | Du Breuil |
| 2021/0409822 | A1 | 12/2021 | Aher |
| 2021/0409823 | A1 | 12/2021 | Sen |
| 2022/0188713 | A1 | 6/2022 | Mcfaddin |
| 2023/0186349 | A1 | 6/2023 | Mcfaddin et al. |

FOREIGN PATENT DOCUMENTS

| | | |
|---|---|---|
| CN | 111159599 A | 5/2020 |
| CN | 116601599 A | 8/2023 |
| KR | 100807871 B1 | 2/2008 |
| KR | 20150010813 A | 1/2015 |
| WO | 2022/121619 A1 | 6/2022 |

OTHER PUBLICATIONS

International Search Report and Written Opinion for International Application No. PCT/CN2021/130210; Application Filing Date Nov. 12, 2021; Date of Mailing Feb. 10, 2022 (9 pages).

List of IBM Patents or Patent Applications Treated as Related, Dec. 13, 2021, 2 pgs.

"Patent Cooperation Treaty PCT Notification of Transmittal of the International Search Report and the Written Opinion of the International Searching Authority, or the Declaration", Applicant's file reference IEE210891PCT, International application No. PCT/CN2021/130210, International filing date , Nov. 12, 2021 (Nov. 12, 2021) Date of Mailing Feb. 10, 2022 (Oct. 2, 2022), 9 pages.

Mcfaddin et al., "Advertisement Placements in Sequential Workflows," U.S. Appl. No. 17/550,141, filed Dec. 14, 2021, 52 pages.

* cited by examiner

200

210

| CHOOSE FLIGHT *Done* | CHOOSE SEATS *You Are Here* | PAY | CONFIRM |

222  Selected flight: 401 from LHR to MIA

224  Please choose an available seat:

220

228

□ Economy, 6 Available

▦ Preferred, 4 Available

▨ Unavailable

230 Ad Space

LHR Lounge Pass

Use your miles

232 Ad

250 *Next*

240
Ad Space

Miami Hotel Offers

5 Deals Available

242 Ad

Lawn Care

Feed your lawn while travelling

244 Ad

300

| 310 Stage Parameters | | | | | 360 |
|---|---|---|---|---|---|
| 364 | 366 1 | 368 2 | 370 3 | 372 4 | 374 5 | |
| 302 | 312 FLIGHT | 322 SEATS | 332 PAY | 342 CONFIRM | 352 CONT. | |
| 372 | 378 current | 380 future | 382 future | 384 future | 386 future | |
| 388 | 390 3 | 392 3 | 394 3 | 396 3 | 398 3 | |
| 304 | 314 V(U,1) = 10 units | 324 V(U,2) = 10 units | 334 V(U,3) = 20 units | 344 V(U,4) = 60 units | 354 V(U,5) = 20 units | |
| 306 | 316 P(U,1) = .40 | 326 P(U,2) = .30 | 336 P(U,3) = .15 | 346 P(U,4) = .10 | 356 P(U,5) = .05 | |
| 308 | 318 E(U,1) = 4 units | 328 E(U,2) = 3 units | 338 E(U,3) = 3 units | 348 E(U,4) = 6 units | 358 E(U,5) = 1 units | 362 E(U) = 17 units |

| 410 Threshold Requirements for Secondary Ad Placements for User U | | | | | |
|---|---|---|---|---|---|
| 402<br><br>Stage Name | 412<br><br>Select Flight | 422<br><br>Select Seat | 432<br><br>Pay | 442<br><br>Confirm | 452<br><br>Continue |
| 404<br><br>Minimum Value Gain | 414<br><br>$V_\Delta(U,1)$ $\geq 5$ | 424<br><br>$V_\Delta(U,2)$ $\geq 10$ | 434<br><br>$V_\Delta(U,3)$ $\geq 50$ | 444<br><br>$V_\Delta(U,4)$ $\geq 20$ | 454<br><br>$V_\Delta(U,5)$ $\geq 15$ |
| 406<br><br>Minimum Gain in Completion Probability | 416<br><br>$P_\Delta(U,1)$ $\geq 0.2$ | 426<br><br>$P_\Delta(U,2)$ $\geq 0.1$ | 436<br><br>$P_\Delta(U,3)$ $\geq 0.3$ | 446<br><br>$P_\Delta(U,4)$ $\geq 0.5$ | 456<br><br>$P_\Delta(U,5)$ $\geq 0.3$ |
| 408<br><br>Minimum Gain in Expected Value | 418<br><br>$E_\Delta(U,1)$ $\geq 1$ unit | 428<br><br>$E_\Delta(U,2)$ $\geq 1$ unit | 438<br><br>$E_\Delta(U,3)$ $\geq 15$ units | 448<br><br>$E_\Delta(U,4)$ $\geq 10$ units | 458<br><br>$E_\Delta(U,5)$ $\geq 4.5$ units |

| 560 Estimated Effects for Secondary Ad Placements Seat Selection Stage | | | | | | 562 Direct Return from Ad |
|---|---|---|---|---|---|---|
| <u>502</u> Stage Name | <u>512</u> Select Flight | <u>522</u> Select Seat(s) | <u>532</u> Pay | <u>542</u> Confirm | <u>552</u> Cont. | |
| <u>504</u> Lounge Pass Offer | <u>514</u> | <u>524</u> $V_A(U,2)$ = 20 $P_A(U,2)$ = 0 | <u>534</u> $V_A(U,3)$ = 0 $P_A(U,3)$ = 0 | <u>544</u> $V_A(U,4)$ = 0 $P_A(U,4)$ = 0 | <u>554</u> $V_A(U,5)$ = 0 $P_A(U,5)$ = 0 | <u>572</u> 2 units |
| <u>506</u> Destination Offer (Hotels) | <u>516</u> | <u>526</u> $V_A(U,2)$ = 0 $P_A(U,2)$ = 0 | <u>536</u> $V_A(U,3)$ = 0 $P_A(U,3)$ = 0.4 | <u>546</u> $V_A(U,4)$ = 0 $P_A(U,4)$ = 0.4 | <u>556</u> $V_A(U,5)$ = 0 $P_A(U,5)$ = 0 | <u>574</u> 2 units |
| <u>508</u> Lawn Care Offer | <u>518</u> | <u>528</u> $V_A(U,2)$ = 0 $P_A(U,2)$ = 0.05 | <u>538</u> $V_A(U,3)$ = 0 $P_A(U,3)$ = 0.05 | <u>548</u> $V_A(U,4)$ = 0 $P_A(U,4)$ = 0.05 | <u>558</u> $V_A(U,5)$ = 0 $P_A(U,5)$ = 0.05 | <u>576</u> 4 units |

FIG. 5

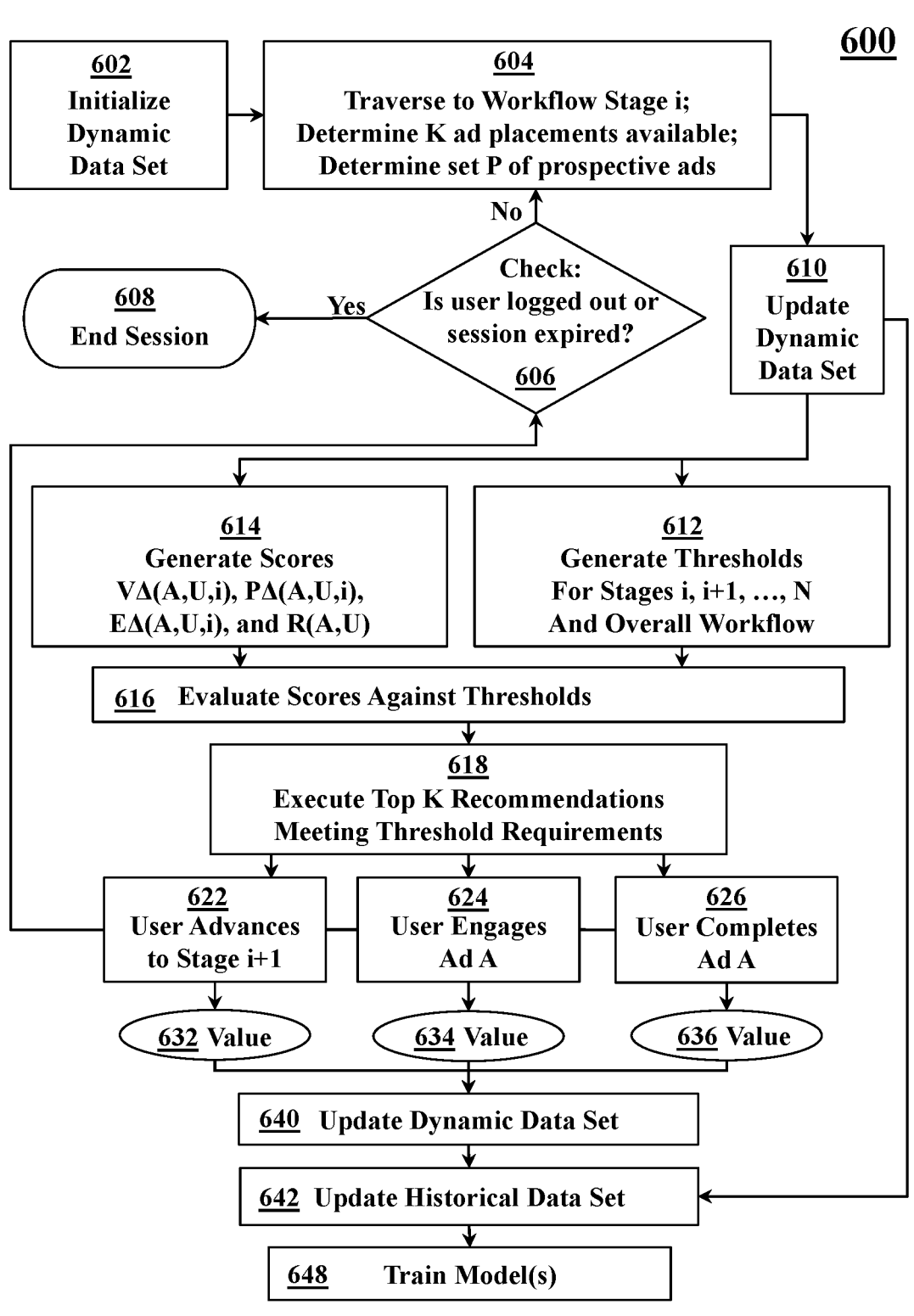

600

602
Initialize
Dynamic
Data Set

604
Traverse to Workflow Stage i;
Determine K ad placements available;
Determine set P of prospective ads Check:
Is user logged out or
session expired?
606

No

Yes

608
End Session

610
Update
Dynamic
Data Set

614
Generate Scores
VΔ(A,U,i), PΔ(A,U,i),
EΔ(A,U,i), and R(A,U)

612
Generate Thresholds
For Stages i, i+1, …, N
And Overall Workflow

616   Evaluate Scores Against Thresholds

618
Execute Top K Recommendations
Meeting Threshold Requirements

622
User Advances
to Stage i+1

624
User Engages
Ad A

626
User Completes
Ad A

632 Value

634 Value

636 Value

640   Update Dynamic Data Set

642   Update Historical Data Set

648     Train Model(s)

810    Engage in Primary Activity

820    Compile Risk-Reward Score

830    Dynamically Update Risk-Reward Score

840    Identify Recommended Stage

850    Display Advertisement

<u>1000</u>

DYNAMICALLY UPDATED ADVERTISEMENT PLACEMENTS IN SEQUENTIAL WORKFLOWS

BACKGROUND

The present disclosure relates to advertisement placements and more specifically to advertisement placements in sequential user workflows.

A user may engage in a primary activity such as an online purchase. An individual offering the primary activity (e.g., selling goods or services) may engage the user in the sequence of stages to complete a primary activity. For an online purchase, the user may engage in the sequence of stages by, for example, browsing a website, selecting a good or service for purchase, adding the good or service to a digital shopping cart, opening the shopping cart, navigating to checkout, verifying cart contents, selecting a payment mechanism, selecting an address for shipment and/or service, and submitting the order.

SUMMARY

Embodiments of the present disclosure include a system, method, and computer program product for advertisement placements in sequential workflows.

A system in accordance with the present disclosure may include a memory and a processor in communication with the memory. The processor may be configured to perform operations. The operations may include engaging a user in a primary activity; the primary activity may include a plurality of stages. The operations may include compiling at least one risk-reward score for an advertisement placement of an advertisement for at least one of the plurality of stages. The operations may include updating, dynamically, the at least one risk-reward score and identifying a recommended stage for the at least one advertisement; the recommended stage may be based on the risk-reward score. The operations may include displaying the at least one advertisement to the user at the recommended stage.

The above summary is not intended to describe each illustrated embodiment or every implement of the disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 3 illustrates a table of example initial stage parameters in accordance with some embodiments of the present disclosure.

FIG. 4 depicts a table of example initial threshold requirements for each stage in accordance with some embodiments of the present disclosure.

FIG. 5 illustrates a table of estimated per-stage effects for an example with three candidates in accordance with some embodiments of the present disclosure.

FIG. 6 depicts a decision logic tree in accordance with some embodiments of the present disclosure.

Figure 1:
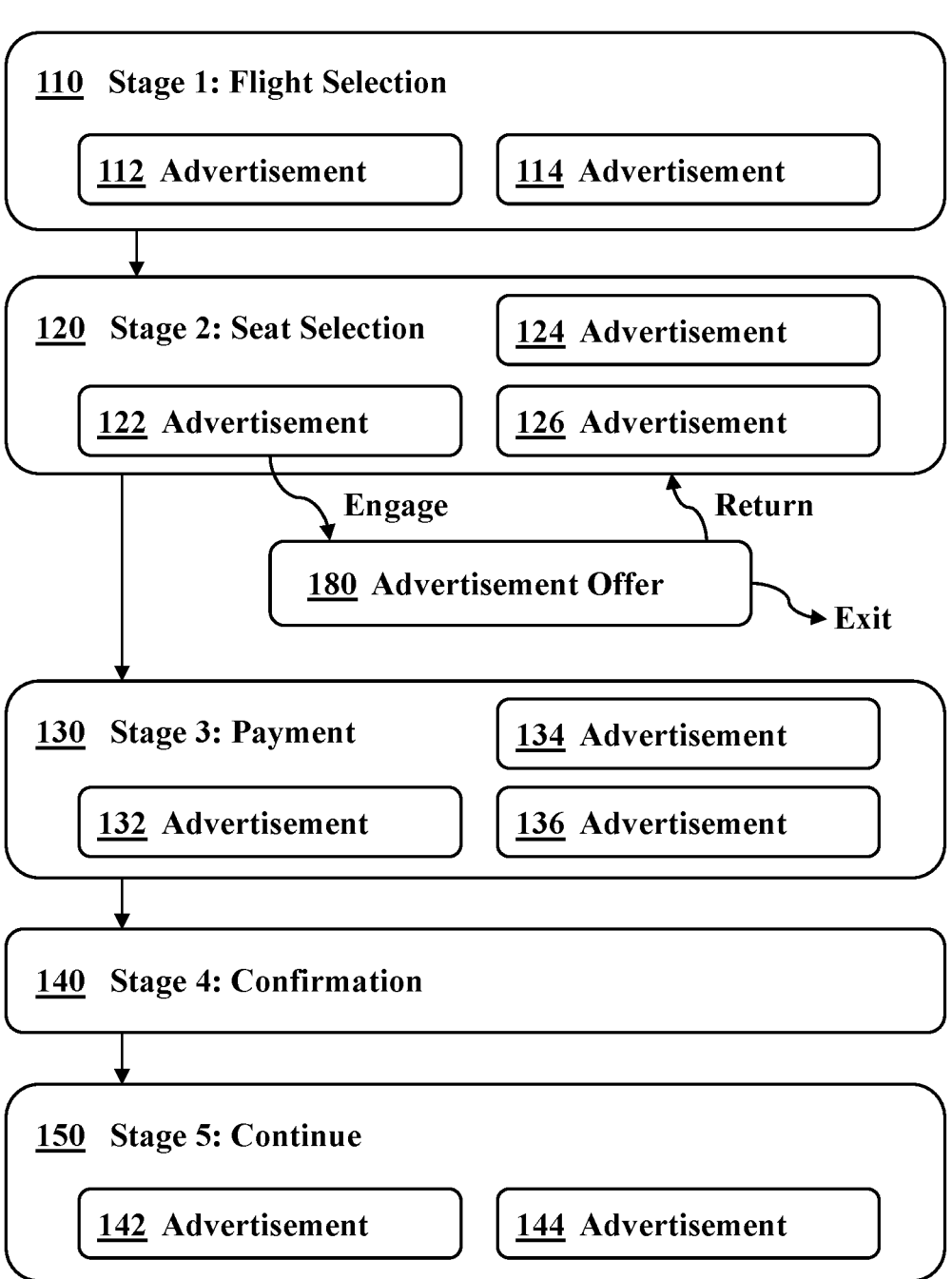
FIG. 1 illustrates a workflow of stages in accordance with some embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to advertisement placements and more specifically to advertisement placements in sequential user workflows.

Marketers may engage users in a sequence of stages to complete a primary activity (e.g., a travel reservation). This primary activity may be enhanced by placing one or more invitations to secondary activities (e.g., advertisements) at various stages. For example, an invitation to a secondary advertisement may allow partner marketers to place advertisements, and a secondary advertisement may offer ancillary services to users. In some cases, a placement of a secondary advertisement may change the likelihood of a user completing the primary activity, either increasing or decreasing the likelihood of completion of the primary activity. Additionally, the likelihoods of completion and valuation of the primary activity may change dynamically based upon user interactions with secondary ads.

Marketers, such as online marketers, may deploy websites and applications that require customer focus to complete a task with a sequence of workflow stages. For example, customers on airline reservation sites must select seats, dates, routes, and more in an ordered progression. In another example, customers on a shopping site advance through shipping and billing stages to complete a shopping cart purchase.

Online marketers may wish to advertise secondary offers to customers as the customers progress through the stages. Secondary offers may include, for example, products and/or services of ancillary services. Such offers may directly complement the primary offering. Marketers may monetize a primary activity by allowing partner marketers to place secondary advertisements for a fee, enabling customers. For example, an airline reservation site may offer lounge services or upgrades to their customers during the reservation process. For example, an airline reservation site may provide banner or ad space to hotels or local tour companies. Such secondary offers may enable customers to traverse to a secondary marketing activity during the primary activity.

The present disclosure describes a system, method, and software for recommending the placement of secondary advertisements by evaluating the tradeoff between the value gains (e.g., monies collected from the display of advertisements) of allowing secondary activity offers during the primary activity and potential value change derived from completing or advancing through the primary activity. Such tradeoffs may be re-evaluated dynamically based upon notifications received from user activities in the secondary advertisements.

A user may be engaged in a primary activity such that the user advances through a workflow with an ordered sequence of stages. The completion of each stage in the primary workflow may have a value which may be dependent on the user and other contextual factors. Secondary advertisements may be displayed to the user at one or more of the stages in the workflow of the primary activity. The placement of a secondary advertisement may induce a diminished or increased probability that the user advances further through or completes the primary activity. A multiplicity of potential secondary advertisements may be considered for placement as the user advances to and through each workflow stage.

The present disclosure provides a method for evaluating a risk-reward tradeoff score induced by the placement of each potential secondary advertisement. Thresholds for this score may be specified such that secondary advertisements must achieve a threshold requirement before the secondary advertisement may be placed; such thresholds may be stage specific. In certain embodiments, machine learning (ML) techniques may be used to compute the risk-reward scores. Such ML techniques may be based on historical data collected during prior user engagements of the primary workflow and periodic retraining of supervised models.

In some embodiments of the present disclosure, the evaluation of the risk-reward scores and the threshold requirements may be performed dynamically. Such dynamic evaluation may be based upon, for example, user activity such as engagement in the primary activity workflow.

The present disclosure considers the impacts of placement decisions on the valuation and the probability of completion of the primary workflow. Further, this disclosure considers per-stage valuations and threshold requirements. This disclosure further considers communication between primary activity and secondary activity entities. The present disclosure also considers dynamic updates such as dynamic updates for risk-reward scores and threshold requirements.

The present disclosure considers placement decisions for advertisements and offers in sequential workflows such that placement decisions may consider both current and future pages in sequential workflows. Additionally, the present disclosure considers the process may be dynamic and responsive to user activities in which intention may have changed.

Customers may traverse to a secondary activity, thus interrupting the work process of the task of the primary site, distracting from the completion of the primary activity. For example, if a customer engages with an advertisement for an airport lounge upgrade, the seats on the flight the customer selected are held available for the customer while the customer engages in the airport lounge upgrade activity.

Several effects may result from traversing to a secondary activity while engaged in a primary activity. In some instances, customers of the primary site may be lost such that the customers do not return to complete the primary activity. In some instances, stale information may be often displayed during the time spent engaging with the secondary activity. In some instances, valuable resources may be tied up, and those resources may be under a high level of contention. The present disclosure may address these and other effects of user engagement.

In some embodiments of the present disclosure, an entity (e.g., a marketer for a company offering a primary activity) may project a value to be returned by each workflow stage; the entity may also project the probability of users completing each workflow stage. The entity may use one or more tools (e.g., ML techniques) to make projections.

In some embodiments, secondary activity notices (such as advertisements) may be considered for placement; a projection may be made of an expected direct return of value (such as a placement fee) from the secondary advertisement. In some embodiments, a projection may be made of the effect of the secondary advertisement on the returned stage values and probabilities of completion of each stage. In some embodiments, the estimated effects of the secondary advertisement must meet threshold requirements to be displayed. Threshold requirements for the secondary advertisement may be established on a per-stage basis.

In some embodiments, secondary advertisements that meet the threshold requirements may be ranked based on the projected direct return value, the overall expected completion value of the primary workflow sequence, and/or the projected impact of the secondary advertisement on the likelihood of the user completing the primary activity. The secondary advertisements may be selected for presentation to the user based on the capabilities, such as display channel, and ranking and/or other comparative value of secondary advertisements.

In some embodiments, notifications may be exchanged between a primary entity and a secondary entity. For example, notifications may be sent from the entity offering the secondary advertisement (e.g., a marketer offering a product) to the primary activity entity (e.g., inter-website communications) as user activities occur on the website of the secondary entity (e.g., sales, collection of information, and the like).

In some embodiments, estimations of stage completion probabilities, stage return values, and stage expected values may be recomputed based on the notification. Threshold values for differentials may also be recomputed based on such notifications. In some embodiments, a placement algorithm may be accomplished based on the notification information. Changes in placement value differentials and threshold differentials may be evaluated. Some placements may be removed and/or replaced with other secondary advertisements (e.g., higher ranking offers) as evaluated by the placement algorithm. Removals and replacements may be adjusted by requiring a configurable minimum change in differentials (e.g., provides a "stickiness" feature).

In some embodiments of the present disclosure, a system may include a memory and a processor in communication with the memory. The processor may be configured to perform operations. The operations may include engaging a user in a primary activity; the primary activity may include a plurality of stages. The operations may include compiling at least one risk-reward score for an advertisement placement of an advertisement for at least one of the plurality of stages. The operations may include updating, dynamically, the at least one risk-reward score and identifying a recommended stage for the at least one advertisement; the recommended stage may be based on the risk-reward score. The operations may include displaying the at least one advertisement to the user at the recommended stage.

In some embodiments of the present disclosure, the operations may include updating, dynamically, the at least one risk-reward score based on activity of the user. In some embodiments, the activity may include data concerning interactions of the user with the at least one advertisement.

In some embodiments of the present disclosure, the operations may include achieving a threshold for the at least one risk-reward score and establishing the threshold on a per-stage basis, wherein the per-stage basis is relative to each of the plurality of stages.

In some embodiments of the present disclosure, the operations may include generating a completion value for each of the plurality of stages; the completion value may reflect contextual factors.

In some embodiments of the present disclosure, the operations may include generating an advancement probability for each of the at least one risk-reward score, wherein the advancement probability identifies an impact of the advertisement placement on a likelihood of the user completing the primary activity.

In some embodiments of the present disclosure, the operations may include quantifying the at least one risk-reward score with a machine learning tool and training the machine learning tool with a database containing historical data of primary activity user engagement.

FIG. 1 illustrates a workflow 100 of stages in accordance with some embodiments of the present disclosure. The stages of the workflow 100 include a first stage 110, a second stage 120, a third stage 130, a fourth stage 140, and a fifth stage 150.

The stages may each include one or more advertisements based on risk-reward scores calculated for each of the advertisements and threshold requirements set for each stage. The workflow 100 depicts a user purchasing a flight itinerary. The first stage 110 is the user selecting a flight. In the first stage 110, the user is displayed two advertisements 112 and 114. The user progresses to the second stage 120 which, in this example, is selecting a seat on the selected flight. The second stage 120 includes three advertisements 122, 124, and 126.

The workflow 100 includes a user engaging with an advertisement 122 to launch an advertisement offer 180. The user may complete the advertisement offer 180 or leave the advertisement offer 180 without completing it. The user may return to the workflow 100 at the second stage 120 because it is the stage the user left the workflow 100 to engage with the advertisement 122 for the advertisement offer 180. The user may opt to exit the workflow 100 from the advertisement offer 180.

The workflow 100 includes a third stage 130. The third stage 130 is a payment stage and it also offers three advertisements 132, 134, and 136. The user may continue to a fourth stage 140 of confirmation. The user may confirm the order and move to the fifth stage 150 where the user may be invited to continue engaging with the primary activity site in other ways. The fifth stage 150 includes two advertisements 142 and 144.

The fourth stage 140 in the workflow 100 does not include any advertisements. This may be, for example, because the risk-reward ratio indicates that diverting user attention during this stage is not likely to have a high enough return in exchange for the relatively high cost of the potential loss of the customer to the external engagement.

Figure 2:
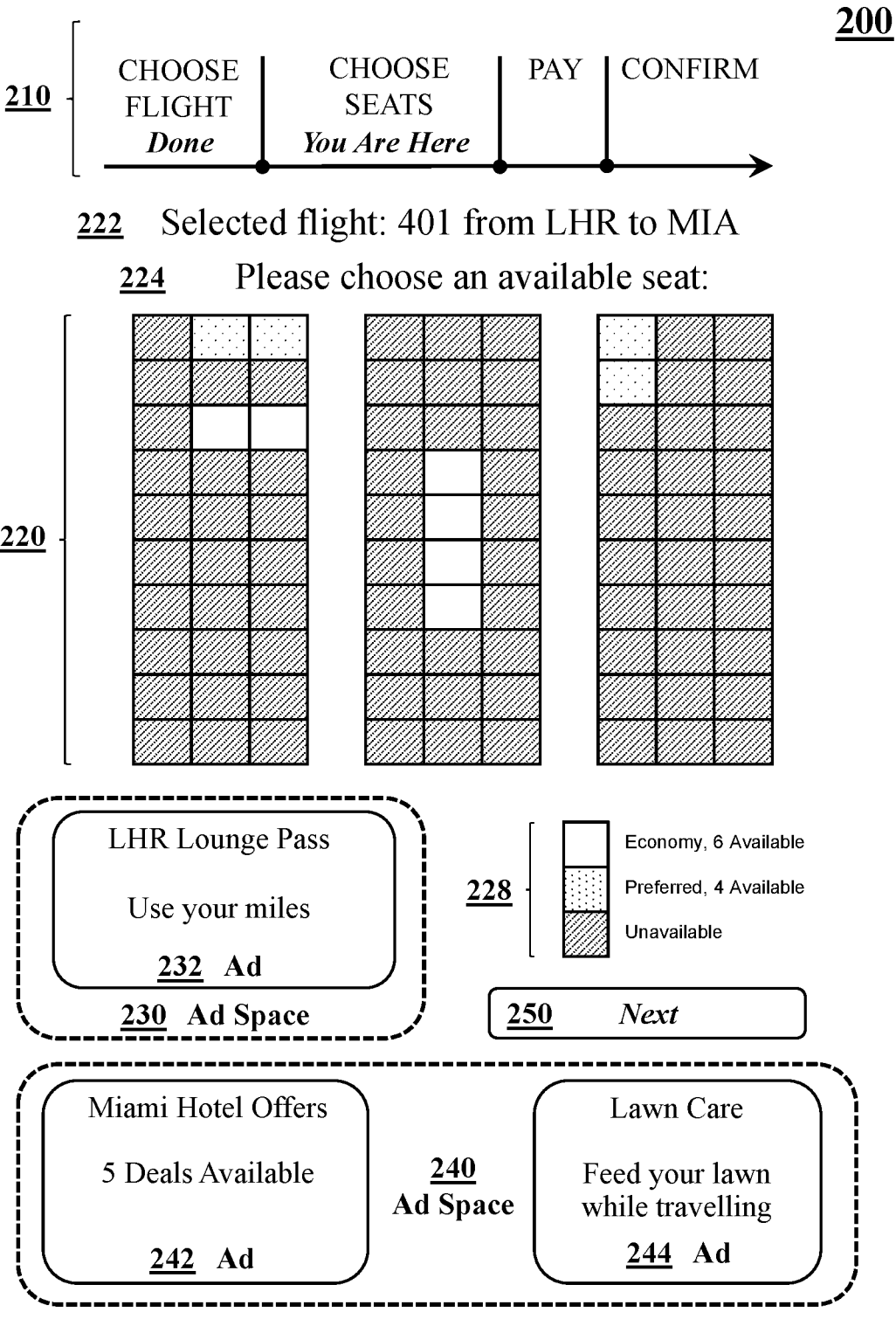
FIG. 2 depicts a user experience stage in accordance with some embodiments of the present disclosure.

FIG. 2 depicts a user experience stage 200 in accordance with some embodiments of the present disclosure. The stage 200 may include a navigation pane 210 to identify where the user is in the process, a selection component 220 with a selection key 228, ad spaces 230 and 240 containing one or more ads 232, 242, and 244, and a next button 250 to continue the workflow. The stage 200 also includes a confirmation 222 of earlier selections in the process as well as an instruction 224 for the current stage 200.

The stage 200 includes availability for placement in three ads 232, 242, and 244 in two ad spaces 230 and 240. In some embodiments and/or in certain stages, fewer or more placements and/or spaces for placements may be available, and different shapes and/or sizes of placements may be available as will be recognized by those skilled in the art.

The ads 232, 242, and 244 in the stage 200 may be tailored to the specific workflow the user is engaged in. For example, the workflow pertains to travel and the featured ads 232, 242, and 244 are a travel upgrade (a lounge pass which may be an ancillary service offered by the primary entity), a destination offer (a hotel offer by a secondary entity), and a service pertinent for taking care of home while away (a lawn care offer through a tertiary entity). In some embodiments, one or more of the advertisements may be directly or indirectly tailored to the workflow and/or stage 200 of the workflow. In some embodiments, one or more of the advertisements may be selected for reasons unrelated or seemingly unrelated to the workflow and/or stage 200.

In some embodiments of the present disclosure, a primary entity may be a primary marketer that operates a web site, mobile app, or other application. The primary marketer may define a sequence of N workflow stages (e.g., 1, 2, 3, . . . N) for a user process. For example, workflow processes may include travel reservation processes and e-commerce cart checkout processes: a site is visited by a user with a goal of completing a workflow process such as making a flight reservation or completing an e-commerce purchase. User contextual information may be maintained such as demographics, past reservations, past purchases, loyalty program data, and the like; for example, a user may have a loyalty rewards program account with an e-commerce retailer and opt in to with customized recommendations for that account.

A dynamic per-user stage parameters table may be maintained and updated for each user as the user progresses through the workflow. A per-stage return value $V(U,i)$ may be estimated for progression through each stage by each user $U$ and recorded in a per-user stage parameters table. The return value estimates may be different for each stage and for each user.

The stage return value estimate may range in meaning based on the embodiment and the objectives thereof. For example, in some embodiments, a stage return value may be monetary such as revenue amounts anticipated from the purchases completed by $U$ during a workflow stage; in some embodiments, the value may be a quantifiable gain from the collection of information from the user and/or the value of the increase in the satisfaction of the user by the content provided to the user. In some embodiments, the value may be derived from the services user may provide in benefit of the marketer as the user progresses through a stage (e.g., giving reviews or other feedback). Some embodiments may incorporate one or more of these values; for example, the stage return value may be the sum of the monetary value and the value derived from user feedback.

For example, in the flight selection stage of a travel reservation workflow process, the primary entity may gain information about the travel preferences of the user, even if the user does not fully complete a travel reservation. Note in this example that the primary entity may estimate a moderate value for completion of the first few stages (e.g., flight and seat selection stages) and a higher value for the completion of the overall reservation (e.g., the payment and confirmation stages). The last stage of the workflow completion may have the highest value because completion of this stage results in the lock-in of the reservation and receipt of payment to the primary entity. The following stage is a follow-on stage of moderate value, in which the user may show interest in continued interaction after purchase confirmation. In some embodiments, the primary entity may change the relative or absolute values of each of the stages; for example, the primary entity may deem other stages to have more substantial values, even if a purchase is not made at the stage.

In some embodiments, a completion probability $P(U,i)$ may be estimated based on the progression through each stage by the user, and the probability may be recorded in a per-user stage parameters table. The completion probability scores may be fractional values that do not necessarily sum to 1.0; for example, the process may be abandoned, resulting in a number less than 1.0. As the probabilities numbers may be normalized, any numerical dimension may be used. Different completion probabilities may be estimated based on various user and contextual factors; for example, a high probability for completion of earlier stages and lower probabilities for later stages may be estimated.

In some embodiments, the primary marketer may have assigned a high completion probability for a user for the first few stages and a decreasing probability for the completion of the overall reservation. The final stage may have a very low probability of completion as relatively few users may show interest in continued interaction after a purchase is confirmed.

The estimation of stage values $V(U,i)$ and completion probabilities $P(U,i)$ may be achieved in a variety of ways; for example, a primary entity may establish static tables, tabulate statistical use by the user or a segment of users, collect historical clickstream and purchase data, and/or use ML estimation techniques such as regression, logistic regression, decision trees and/or forests, gradient boosting, artificial neural networks, and the like.

In some embodiments, an expected value $E(U,i)$ for each stage may be computed and/or maintained in a per-user stage parameters table. The expected value may be computed in a variety of ways. The product of the estimated stage values and the stage completion probability may be used as an expected return value for the stage. This may be expressed as:

$$E(U,s)=V(U,s)\times P(U,s)$$

wherein U is the user, s is the workflow stage, $E(U,s)$ is the expected value for a user at a stage, $V(U,s)$ is the stage value for a user at a stage, and $P(U,s)$ is the completion probability for a user at a stage.

In some embodiments, an expected return $E(U)$ of the overall workflow may be computed and/or maintained in the per-user stage parameters table. The expected return may be computed in various ways. For example, an expected return of an overall workflow may be the sum of estimated actual returns for completed stages in the workflow plus the expected returns estimated for the current and future stages. Such values may also be updated as the user progresses through the workflow.

In some embodiments, the estimated stage return values, stage completion probabilities, stage expected and realized values, and contextual information may be dynamically maintained and updated in the per-user stage parameters table. Each stage may be described by a status parameter such as complete, current, or future. Additional information about the activities completed during the stage, monetary, and other types of values realized during the execution of the stage may also be reflected in the status parameter description.

In some embodiments, as a user proceeds through the workflow stages, the primary entity may update a stage parameters table. The stage return value and expected value for each complete stage may be set to either a previously estimated value or may be updated to an actual measured form of the value such as revenue collected, information collected, or user satisfaction gain. In some embodiments, the completion probability for complete stages may be set to 1.0. In some embodiments, the estimated return values, stage completion probabilities, and/or expected values of the current and future stages may be updated as the user progresses.

In some embodiments, advertisement placement may be allowed at select stages within the workflow, for example, to monetize the workflow. In some embodiments, placed advertisements may promote and/or provide access to ancillary services and/or offers by the primary marketer, and/or to offerings provided by affiliates such as secondary marketers.

In some embodiments, the placement of an advertisement at a current workflow stage may mean that some form of content may be made visible to a user during the interactions of the user at the workflow stage along with the content of the stage itself. Placements may have different manifestations depending upon the channel of user interaction and may be different, for example, between a web site mechanism and a mobile device mechanism.

In some embodiments, a plurality of advertisements may be eligible for placement in a given current workflow stage in competition for a limited number of placement opportunities K. A variety of mechanisms may be implemented for determining the plurality of eligible ads; for example, systems based on bidding may be implemented. In some embodiments, a variety of mechanisms may be implemented for determining the available set of placement opportunities in a current workflow stage such as, for example, static page layouts in a web site; in some embodiments, a dynamic mechanism may determine the number of placement opportunities for one more of communication such as a web browser may differ from that of another mode of communication such as a mobile application.

The placement opportunities may be different for different workflow stages. For example, workflow stages which are critical may not allow any placements (e.g., K=0). In some embodiments, the value of K may vary over time, for a given workflow stage, and/or across users. The placement opportunities may be computed based upon fixed settings (e.g., page layout) and/or may be varied based upon context. Placement opportunities may be computed based on expected future collection of information from the user (e.g., the likelihood of a user completing a survey upon completion of a purchase) or future limitations in the workflow (e.g., if future stages are determined not to permit ads, then the placement opportunities for the current stage may be increased or otherwise relaxed to permit more advertisements).

Placement opportunities may include various forms of a set determination rather than a simple number of advertisements that may be placed. In some embodiments, the placement opportunities may be a limiting mechanism; for example, a set of requirements placed on an advertisement type or other contextual information and may have a functional manifestation such as a testing function.

In some embodiments, placement opportunities may be computed on a per user basis. In some embodiments, placement opportunities may be computed in an increasing or decreasing way on a time basis; for example, if a user is taking a long time to complete a process, the placement opportunities value may be reduced to enhance user concentration.

In some embodiments, the present disclosure enables a decision about which placement opportunity values among the plurality of eligible ads may be placed into each workflow stage once the placement opportunity value is determined.

In some embodiments, for each eligible advertisement, user, and current workflow stage, an advertisement return value $R(A,U)$ may be estimated to represent the value anticipated to be realized by the placement of the advertisement A into the content stream of the current workflow stage for the user U. In some embodiments, $R(A,U)$ may represent a value derived internally (e.g., quantifying whether an ancillary purchase from the primary entity complements a main purchase) or a value provided in the form of a pecuniary return (e.g., placement fees returned by an affiliate marketer placing the advertisement).

In some embodiments, the anticipated return value from the placement of the advertisement may come with risks. For example, placement of an advertisement may disrupt the primary purpose of the workflow; an advertisement may compete with the workflow and/or distract the user from the primary workflow such that if the user interacts with the advertisement (e.g., by clicking on a link), then the user may not return to complete the primary workflow. In addition, the placement of an advertisement into the current workflow stage may have individual per-stage effects on the estimated return value, completion probability, and expected value of each subsequent stage in the workflow.

In some embodiments, for each subsequent stage, a user-specific differential return value estimate $V_A(A,U,i)$ may be computed to estimate a change in anticipated return value induced by the placement of an advertisement, considering the current stage and assuming user U completes stage i after advertisement A is placed into the current stage. For each subsequent stage, a user-specific differential completion probability estimate $P_A(A,U,i)$ may be computed to estimate a change in anticipated probability of completing a stage as induced by the placement of advertisement into the stage. For each subsequent stage, a user-specific differential expected value estimate $E_A(A,U,i)$ may be computed to estimate a change in anticipated expected value as induced by the placement of advertisement into the stage.

In some embodiments, estimations of per-stage effects $V_A(A,U,i)$, $P_A(A,U,i)$ and $E_A(A,U,i)$ and estimated direct returns $R(A,U)$ for candidate advertisements may be achieved in a variety of ways known in the art or hereinafter discovered. In some embodiments, such estimations may be completed on a per-user basis. In some embodiments, various characteristics may be considered during such estimations such as, for example, characteristics of advertisements, user, workflows, and contextual information. For example, if a user belongs to a known segment, then characteristics of that segment may be used in place of or in addition to individual characteristics of the user; if no user or segment characteristics are known, then default values may be used and/or historical averages may be used. For example, statistical tallies may reveal that displaying hotel advertisements to users in a certain segment of users at the seat selection stage decreases the probability of completing each remaining workflow stage by 5 percentage points.

In some embodiments, characteristics of an advertisement may include specific information about the advertisement such as content (e.g., what is offers or in what magnitude), the category of the advertisement at one or more levels, and/or the identity of characteristics of the secondary entity offering the advertisement.

In some embodiments, expected returns and effects for advertisement placements may be computed in various ways, including those known in the art or hereinafter discovered. For example, a placement fee based upon a fixed table or based upon bidding may be used as the estimated direct return value. Advertisements may produce returns in various ways, including those known in the art or hereinafter discovered; for example, an additional conversion fee may be returned if a user traverses to an advertisement offer and completes a sale.

In some embodiments, thresholds, expected returns, and effects may also be computed probabilistically by combining historical knowledge of user outcomes (e.g., how often a user will statistically view an advertisement, click on it, and complete a sale). Such values may be computed via training of an ML model in which historical data about user procession through the workflow is collected and the expected outcomes are modeled (e.g., via logistic regression, decision trees, random forests, gradient boosted trees, and/or artificial neural networks).

In some embodiments, estimated stage effects and return values for advertisements may be computed via promised effects and/or fees by the advertisers. For example, an expected return for an advertisement may be calculated based on an offered placement fee which the secondary entity will pay. A secondary entity may increase placement likelihood by offering a higher placement fee which may impact the estimated direct return of the advertisement. Such mechanisms may be incorporated into a bidding process.

For example, advertisement characteristics may be modelled via ML techniques to produce a table of anticipated effects and returns for an advertisement and/or its characteristics. Such effects and returns may be examined by a primary entity to produce a revised set of thresholds and/or return values that advertisements must achieve. The values may be transmitted to a pool of affiliates (e.g., other entities) and revisions of the advertisement characteristics (e.g., changes to offered placement fees) may be received.

In some embodiments, the present disclosure enables a primary entity to prevent diversions of the primary workflow by advertisements unless the advertisements return a sufficient value. The present disclosure may enforce required per-stage and per-workflow threshold effects and/or returns in values which the placement of advertisements must achieve.

In some embodiments, the threshold requirement values may specify minimum differentials in stage return value $V_A(A,U,i)$, stage completion probability $P_A(A,U,i)$, and/or stage expected values $E_A(A,U,i)$ such that placement of an advertisement must achieve certain thresholds to be placed in the primary workflow. Threshold requirements may be positive or negative depending upon various goals such as the motivations and strategy of the primary entity. Negative thresholds, for example, may allow limited damage to the goals of the primary workflow in exchange for gains $R(A,U)$ from an advertisement placement. Positive thresholds may require beneficial effects of an ad placement rather than tolerance of a loss.

In some embodiments, required threshold differentials may be stored in a threshold requirements table and updated dynamically as a user proceeds through the workflow. The threshold requirements table may be maintained on a per-stage and per-user basis. The threshold requirements table may contain blank values (e.g., to indicate that the primary entity does not wish to impose a requirement) which may generally be equivalent to a value of negative infinity. In some embodiments, an overall return value requirement may also be computed on the expected return provided by a placed advertisement.

The aforementioned requirements may be computed dynamically and may consider returns from prior stages. For example, if a high return has already been realized by advertisement placements in earlier stages, the return value required may be loosened. In some embodiments, the requirements may be made on an aggregate basis in which groups of placed advertisements are considered together. For example, if a group of advertisements including A1, A2, and A3 are placed together, the aggregate effect of the group may be considered; this group may have an aggregate effect that differs from the group of advertisements including A1, A2 and A4. Aggregate effects may be computed via statistical and/or ML processes (e.g., by modelling occurrences of individual or categorical advertisement combinations such as a hotel and a car rental and a dining reservation) as grouped placements and imposing conditions on the groups.

In some embodiments, the values specified in the threshold requirements table may represent a strategy by the primary entity for the placement of secondary advertisements; for example, the threshold requirements may be manually specified, computed and probabilistic in nature, or some combination thereof. In some embodiments, values may be computed with various tools such as, for example, using ML techniques.

In some embodiments, estimations of stage value, completion probability, expected value, and and/or required threshold differentials may initially be calculated using only contextual information about a user and/or the primary workflow itself without the consideration of secondary factors such as placement of advertisements. As the user progresses through the workflow, these estimates may be updated based upon further enrichment of contextual information about the user, the session, and contextual information about which advertisements have been displayed, engaged with, or completed at prior stages in the workflow.

In some embodiments, a threshold requirements table may be manually established and/or statically maintained based on design considerations about the primary workflow. In some embodiments, a threshold requirements table may be updated gradually to impose requirements as a user proceeds and more information is collected.

Traversal to, and completion of, secondary activities may complement the activities of a primary workflow. In some embodiments, a secondary activity may increase the value returned through a primary activity. In some embodiments, a secondary activity may be calculated to increase the likelihood of completion of some or all of the primary workflow stages. For example, if a user chooses a hotel via an advertisement placed in the flight selection stage, it may increase the likelihood of choosing a flight to a destination for which the hotel reservation was purchased.

In some embodiments, the present disclosure enables the consideration of potential gains from an advertisement placement in addition to gains from placement fees. Additionally, the present disclosure considers the risks of interruption to the primary workflow activity.

In some embodiments, the present disclosure may incorporate expected value requirements as a way of estimating the total effect of placement of an advertisement on each stage in the primary workflow when engaged by a user. The total effect may consider a probability of completion of a stage if an advertisement is placed as well as changes in the likely value returned by the stage and the risk-reward values provided by the advertisement.

In some embodiments, an additional consideration may be that the risk-reward effects of placement of an advertisement may impact different stages in different ways; the present disclosure considers the impact by an advertisement placement on each workflow stage separately. For example, placement of an advertisement for hotels may highly impact a flight selection stage but have little impact on a seat selection stage.

In some embodiments, threshold requirements may be zero, positive (e.g., requiring a positive return by placement of an advertisement), or may be selectively or globally negative (e.g., relaxing the requirement of a positive return as the tolerance of a negative return may be exchanged for alternative gains).

In some embodiments, a placement strategy may be used in which a primary entity may make a requirement that advertisements placed into a workflow do not decrease the likelihood of completion of any stage in the primary workflow. In such an embodiment, all threshold differentials for completion probabilities may be set to zero and the remainder of the threshold values may be left blank. Such threshold values may mean that any placed advertisement must, at a minimum, be neutral in effecting the probable completion actions of the user and that the thresholds are not set to require how an advertisement placement may affect the likely value of any part of the primary workflow sequence.

In some embodiments, a placement strategy may be used in which a primary entity only requires advertisements placed in a workflow do not decrease an expected return of the stages in the primary workflow. In such an embodiment, all threshold differentials may be set to zero such any placed advertisement must be neutral in effect on the primary sequence; in such an embodiment, if an advertisement decreases the likelihood of stage completions, the advertisement must also increase the expected value.

In some embodiments, a primary entity may engage in a placement strategy requiring any placed advertisement to have no negative effect globally. In such an embodiment, neither the completion probability nor likely realized value of any workflow stage may be reduced by placement of an advertisement. A primary entity may achieve this goal by setting all threshold values to zero which may, in turn, place a high hurdle on advertisements.

In some embodiments, a primary entity may engage a placement strategy in which any placed advertisement uniformly increases the expected value of each workflow stage by a given amount. As such, the primary marketer may not give any preference to a particular stage. In such embodiments, the primary entity may not distinguish how an advertisement achieves the increase; the increase may be achieved, for example, through effecting the increase in likelihood of completion of each stage and/or through increasing the value of the stage.

In some embodiments, a primary entity may utilize a highly focused placement strategy by requiring any placed advertisements increase the likelihood of completion of a specific stage. For example, a primary entity may require an advertisement increase the likelihood of a user completing the payment and confirmation stages. Such a requirement may be implemented such that a substantially greater margin is required at these stages than other stages.

In some embodiments, some stages (e.g., the flight and seat selection stages) use lower thresholds for the placements of advertisements as the risk of losing a sale is relatively minor. As a result, selection of an advertisement in such stages may immediately result in a pop-up of the secondary advertisement. In some embodiments, such engagement may involve navigation to a secondary site operated by a secondary entity and not operated by the primary entity.

In some embodiments, each of the later stages (e.g., both the payment and confirmation stages) may specify a high completion probability and other high threshold requirements. These requirements may make it difficult to achieve the placement of any advertisement in these stages unless the advertisement returns an exceptional value.

FIG. 3 illustrates a table 300 of example initial stage parameters in accordance with some embodiments of the present disclosure. The table 300 includes a header 310 for the stage parameters, stages, parameters, a result column 360, and an expected value result sum 362.

The table 300 of stage parameters includes a stage number row 364 for the first stage 366, second stage 368, third stage 370, fourth stage 372, and fifth stage 374. The table 300 of stage parameters includes a stage name row 302 for the flight selection stage 312, seat selection stage 322, payment stage 332, confirmation stage 342, and continuation stage 352. The table 300 of stage parameters includes the status row 372 for the current stage 378 and the future stages 380, 382, 384, and 386. The table 300 of stage parameters includes a placements available row 388 for the number of placements 390, 392, 394, 396, and 398 for each stage.

The table 300 of stage parameters includes a stage value row 304 for the stage values 314, 324, 334, 344, and 354 for each of the stages. The stage values 314, 324, 334, 344, and 354 are a function of the user U. The stage values 314, 324, 334, 344, and 354 are also a function of the stage reflected at the top of the column denoted in the stage number row 364.

The table 300 of stage parameters includes a stage completion probability row 306 for the stage completion probabilities 316, 326, 336, 346, and 356 for each of the stages. The stage completion probabilities 316, 326, 336, 346, and 356 are a function of the user U. The stage completion probabilities 316, 326, 336, 346, and 356 are also a function of the stage reflected at the top of the column denoted in the stage number row 364.

The table 300 of stage parameters includes a stage expected value row 308 for the stage expected values 318, 328, 338, 348, and 358 for each of the stages. The stage expected values 318, 328, 338, 348, and 358 are a function of the user U. The stage expected values 318, 328, 338, 348, and 358 are also a function of the stage reflected at the top of the column denoted in the stage number row 364. The stage expected value of a given stage may be computed by multiplying the stage value of that stage by the completion probability of that stage. This may be expressed as:

$$E(U,s) = V(U,s) \times P(U,s)$$

wherein U is the user, s is the workflow stage, E(U,s) is the expected value for a user at a stage, V(U,s) is the stage value for a user at a stage, and P(U,s) is the completion probability for a user at a stage.

The table 300 of stage parameters includes a result column 360 which reflects the overall expected return of the workflow for the user across the various stages. The result column 360 includes an overall expected value 362 which is the sum of the expected values of all of the stages in the workflow. This may be expressed as:

$$E(U) = \Sigma_{i=1}^{n} E(U,s_i)$$

wherein E(U) is the overall expected value for the user in the workflow and n is the number of stages in the workflow.

FIG. 4 depicts a table 400 of example initial threshold requirements for each stage in accordance with some embodiments of the present disclosure. The table 400 includes a header 410 for the stage parameters, stages, and a variety of parameters.

The table 400 of stage parameters includes a stage name row 402 for the flight selection stage 412, seat selection stage 422, payment stage 432, confirmation stage 442, and continuation stage 452.

The table 400 of stage parameters includes a minimum value gain row 404 for the minimum required values 414, 424, 434, 444, and 454 for each of the stages. The minimum required values 414, 424, 434, 444, and 454 are a function of the user U. The minimum required values 414, 424, 434, 444, and 454 are also a function of the stage. The minimum required values 414, 424, 434, 444, and 454 may also be a function of various inputs such as, for example, risk tolerance of the primary entity and similar variables.

The table 400 of stage parameters includes a minimum gain in completion probability row 406 for the minimum gain completion probabilities 416, 426, 446, 446, and 456 for each of the stages. The minimum gain completion probabilities 416, 426, 436, 446, and 456 are a function of the user U. The minimum gain completion probabilities 416, 426, 436, 446, and 456 are also a function of the stage. The minimum gain completion probabilities 416, 426, 436, 446, and 456 may also be a function of various inputs such as, for example, risk tolerance of the primary entity and similar variables.

The table 400 of stage parameters includes a minimum gain in expected value row 408 for the minimum gain in expected values 418, 428, 438, 438, and 458 for each of the stages. The minimum gain in expected values 418, 428, 448, 448, and 458 are a function of the user U. The minimum gain in expected values 418, 428, 438, 448, and 458 are also a function of the stage. The minimum gain in expected values 418, 428, 438, 448, and 458 may also be a function of various inputs such as, for example, risk tolerance of the primary entity and similar variables. The stage expected value of a given stage may be computed by multiplying the stage value of that stage by the completion probability of that stage.

In some embodiments, estimated direct returns and estimated per-stage effects may be computed for advertisements pending placement in a seat selection stage. For example, a lounge pass advertisement may be an advertisement to be placed by the primary entity for an ancillary service. The lounge pass advertisement may be estimated to generally have zero effect on most of the sequential workflow with the exception of the seat selection stage for which it increases the likely value of the stage substantially. This may be due, for example, to a statistical correlation between users who select premiums like lounge passes and higher caliber seat position.

In such an embodiment, an advertisement offering hotel services may increase the likelihood of completing finalizing stages (e.g., the payment and confirmation stages) of the reservation as reserving a hotel may increases the likelihood of completing the travel reservation. As such, presentation of a hotel advertisement may increase the completion probabilities of later stages. In some embodiments, such a presentation may not increase the dollar values associated with the stages and/or the advertisement placements.

In such an embodiment, an advertisement may be placed that is not directly related to the primary workflow. For example, a lawn care advertisement may be unrelated to a travel reservation; as such, its placement into the workflow may be a distraction therefrom rather than an enhancement thereof. As such, the per-stage value effects of a lawn care advertisement on a travel reservation web site may be estimated as zero and its per-stage effect on completion probabilities may be negative because placing a lawn care advertisement into a travel reservations workflow may reduce the likelihood of the user completing the workflow stages. The diverted attention of the user may, for example, result in a reduction of the likelihood of user completion of the primary workflow by approximately 5 percentage points. In such an embodiment, the estimated return value may be larger for such an advertisement as an affiliate may offset this negative impact on the estimated completion likelihood by paying a high placement fee.

FIG. 5 illustrates a table 500 of estimated per-stage effect values for an example with three candidates in accordance with some embodiments of the present disclosure. The table 500 includes the expected change of stage values $V_A$ and the expected change of completion probability values $P_A$ for each of the advertisement placement candidates at each of the stages.

The table 500 of estimated effects reflects values at the seat selection stage of the workflow. The table 500 of estimated effects includes a stage name row 502 for the flight selection stage 512, seat selection stage 522, payment stage 532, confirmation stage 542, and continuation stage 552. The expected change of values 514, 516, and 518 for the flight selection stage 512 in the table 500 includes a blank flight selection stage 512 because the user is in the seat selection stage 522 and the table is projecting future values and the flight selection stage 512 is a prior value. In some embodiments, the present disclosure may also be used to generate values for users who may return to a previous stage.

The table 500 includes a returns column 562. The returns column 562 shown is the direct return from the advertisement candidates. The direct return values 572, 574, and 576 may be used in some embodiments to compare advertisement candidates with respect to the anticipated returns (e.g., compensation from affiliates) from each of the candidates.

The table 500 of stage parameters includes a first candidate row 504 for the expected change of values 514, 524, 534, 544, and 554 for each of the stages. The expected change of values 514, 524, 534, 544, and 554 are a function of the user U and the stage i. In some embodiments, the expected change values may also be functions of other variables as will be appreciated by those with skill in the art.

The table 500 of stage parameters includes a second candidate row 506 for the expected change of values 516, 526, 536, 546, and 556 for each of the stages. The expected change of values 516, 526, 536, 546, and 556 are a function of the user U and the stage i. In some embodiments, the expected change values may also be functions of other variables as will be appreciated by those with skill in the art.

The table 500 of stage parameters includes a third candidate row 508 for the expected change of values 518, 528, 538, 548, and 558 for each of the stages. The expected change of values 518, 528, 538, 548, and 558 are a function of the user U and the stage i. In some embodiments, the expected change values may also be functions of other variables as will be appreciated by those with skill in the art.

In some embodiments, the placement availability may be based on contextual information such as screen space, user tolerance, and/or other factors. In some embodiments, at any given time, there may be a limit of available placements K and the primary entity may consider a plurality of potential advertisements and/or potential advertisement clusters (e.g., A1, A2, and A3) for placement. In such an embodiment, certain requirements may be used to screen advertisements and/or advertisement groups for placement into the workflow.

For example, a primary entity may require that the individual minimum threshold requirements for the estimated effects of an advertisement for the current and each future stage must be met. Additionally, the primary entity may require that the combination (e.g., a sum) of the expected direct return from the advertisement plus the total expected values across all current and future stages, adjusted for the estimated effects of the placement of the advertisement, must meet a global threshold. Moreover, the primary entity may require that the sum of the expected direct return from the advertisement plus the total adjusted expected values across all current and future stages in the presence of the advertisement must maximally rank among the highest absolute value of the available placements across all potential advertisements and/or advertisement clusters.

In some embodiments, a primary entity may form ensembles of the advertisements such that each advertisement ensemble has a cardinality of k or less. The primary entity may estimate new expected direct returns and/or stage effects for the ensembles and select the highest-ranking ensembles (e.g., treat the ensemble as a single advertisement).

Additionally, in some embodiments, a process may be made dynamic in which some or all of the stage parameters, thresholds, and/or expected effects and/or returns may be computed as the user performs actions, notifying the primary marketer of the actions. For example, if a user selects a hotel offer, then the characteristics of other advertisements may change based on the new context (e.g., the user is interested in offers near the location of the hotel). The primary entity may opt to update the advertisement placements, bidding requirements, and/or other characteristics of the workflow. Such updates may be visible to the user; for example, the display may be revised dynamically, including the advertisements or characteristics of the workflow itself.

In some embodiments, thresholds may be dynamic; in some embodiments, thresholds may also be based upon contextual information. For example, if a user has selected an imminent travel date and time, minimum required completion probabilities may be increased such that advertisements do not distract the user from the primary workflow. In some embodiments, information about the medium through which the user is engaging the primary site may be considered; for example, the thresholds may impose tighter completion probability thresholds for a device with a small display compared to a device with a large display as the primary entity may identify that the user may need more focus in a small display scenario.

FIG. 6 depicts a decision logic tree 600 in accordance with some embodiments of the present disclosure. The decision logic tree 600 includes initializing 602 a data set and traversing 604 to a workflow stage where ad placements and prospective ad sets may be determined. The data set may be updated 610 and then used to generate 612 one or more thresholds for each of the stages and for the overall workflow as well as generate 614 scores for the stage differentiation values $V_A(A,U,i)$, completion probability differentiation values $P_A(A,U,i)$, expected differentiation values $E_A(A, U,i)$, and/or return values $R(A,U)$.

The scores may be evaluated 616 against the thresholds. The top placement opportunities K meeting the threshold requirements may be executed 618. A user may advance 622 to a stage, engage 624 with an ad, and/or complete 626 the ad offer, each of which may derive a value 632, 634, and 636. The derived values 632, 634, and 636 may be used to update 640 the dynamic data set. The updated dynamic data set may be used to update 642 the historical data set. The updated historical data set may be used to train 648 and/or retrain models (e.g., ML models).

In some embodiments, as a user advances 622 through a workflow, the system may perform a check 606 to ensure the user is still logged into the session. If the user is no longer logged in or if the session is expired, the system may end 608 the session. If the user is still logged in, the user may be routed to traversing 604 a stage in the workflow. In some embodiments, the user may be routed to the stage in the workflow which the user most recently was occupying; in some embodiments, the user may be routed to the first stage in the workflow, a previous stage in the workflow, or a later stage in the workflow, in accordance with, for example, contextual information and/or settings established by the primary entity.

Figure 7:
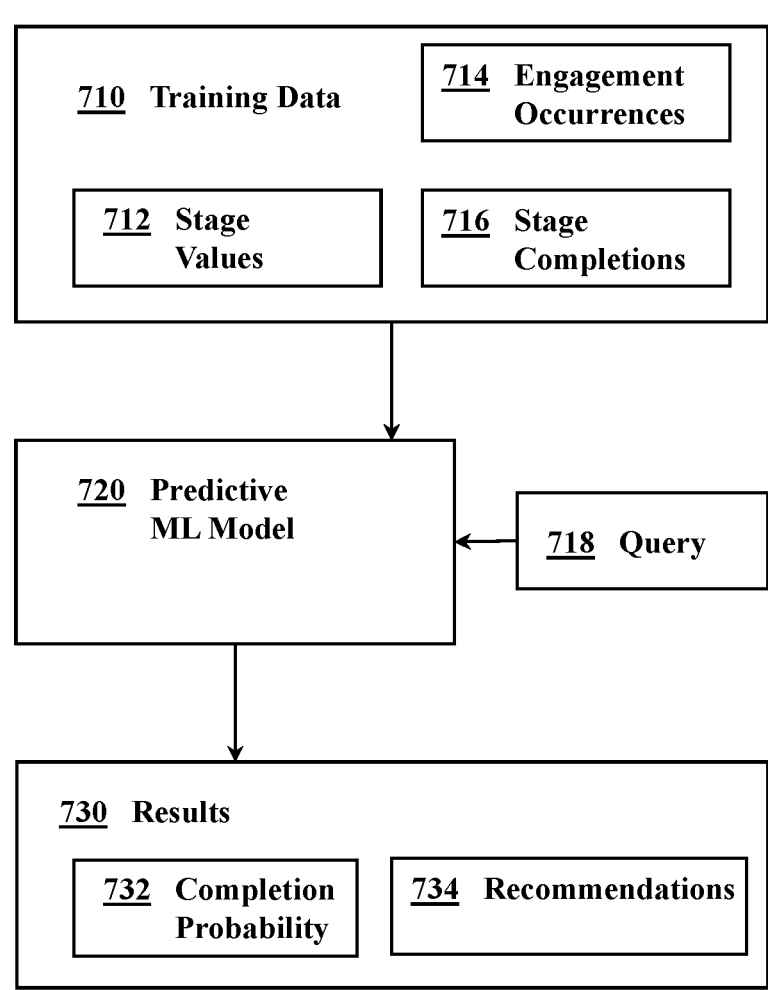
FIG. 7 illustrates a machine learning model workflow in accordance with some embodiments of the present disclosure.

FIG. 7 illustrates an ML model workflow 700 in accordance with some embodiments of the present disclosure. The ML model workflow 700 includes using training data 710 to train a predictive ML model 720. The predictive ML model 720 is then submitted a query 718 and produces results 730.

The training data 710 may include stage values 712, engagement occurrences 714, and stage completions 716. The query 718 may concern whether or where to place an advertisement or an advertisement cluster. The results 730 may include information such as a completion probability 732 and one or more recommendations 734. In some embodiments, other results 730 may be generated such as, for example, stage return values, stage expected values, differentiation values on a per-stage basis, expected gains, threshold data, and the like.

In some embodiments of the present disclosure, a computer-implemented method may include engaging a user in a primary activity; the primary activity may include a plurality of stages. The method may include compiling at least one risk-reward score for an advertisement placement of an advertisement for at least one of the plurality of stages and updating, dynamically, the at least one risk-reward score. The method may include identifying a recommended stage for the advertisement; the recommended stage may be based on the risk-reward score. The method may include displaying the advertisement to the user at the recommended stage.

In some embodiments of the present disclosure, the method may include updating, dynamically, the at least one risk-reward score based on activity of the user. In some embodiments, the activity may include data concerning interactions of the user with the at least one advertisement.

In some embodiments of the present disclosure, the method may include achieving a threshold for the at least one risk-reward score and establishing the threshold on a per-stage basis, wherein the per-stage basis is relative to each of the plurality of stages.

In some embodiments of the present disclosure, the method may include generating a completion value for each of the plurality of stages; the completion value may reflect contextual factors.

In some embodiments of the present disclosure, the method may include generating an advancement probability for each of the at least one risk-reward score; the advancement probability may identify an impact of the advertisement placement on a likelihood of the user completing the primary activity.

In some embodiments of the present disclosure, the method may include quantifying the at least one risk-reward score with a machine learning tool and training the machine learning tool with a database containing historical data of primary activity user engagement.

Figure 8:
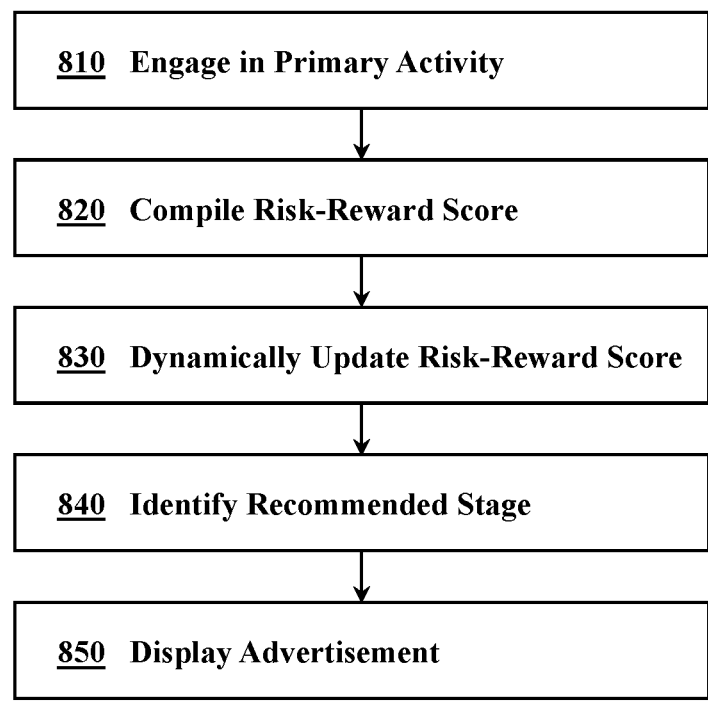
FIG. 8 depicts a method for dynamically updating advertisement placements in accordance with some embodiments of the present disclosure.

FIG. 8 depicts a method 800 for dynamically updating advertisement placements in accordance with some embodiments of the present disclosure. The method 800 includes engaging 810 in a primary activity and compiling 820 a risk-reward score. The method 800 includes dynamically updating 830 the risk-reward score; in some embodiments, the method 800 may include dynamically updating 830 the risk-reward score and/or threshold requirements. The method 800 includes identifying 840 a recommended stage and displaying 850 an advertisement on the recommended stage.

In some embodiments of the present disclosure, a computer program product may include computer readable storage medium having program instructions embodied therewith, the program instructions executable by a processor to cause the processor to perform a function. The function may include compiling at least one risk-reward score for an advertisement placement of an advertisement for at least one of the plurality of stages and updating, dynamically, the at least one risk-reward score. The function may include identifying a recommended stage for the at least one advertisement; the recommended stage may be based on the risk-reward score. The function may include displaying the at least one advertisement to the user at the recommended stage.

In some embodiments of the present disclosure, the function may include updating, dynamically, the at least one risk-reward score based on activity of the user; the activity may include data concerning interactions of the user with the at least one advertisement.

In some embodiments of the present disclosure, the function may include achieving a threshold for the at least one risk-reward score and establishing the threshold on a per-stage basis; the per-stage basis may be relative to each of the plurality of stages.

In some embodiments of the present disclosure, the function may include generating a completion value for each of the plurality of stages; the completion value may reflect contextual factors.

In some embodiments of the present disclosure, the function may include generating an advancement probability for each of the at least one risk-reward score; the advancement probability identifies an impact of the advertisement placement on a likelihood of the user completing the primary activity.

In some embodiments of the present disclosure, the function may include quantifying the at least one risk-reward score with a machine learning tool and training the machine learning tool with a database containing historical data of primary activity user engagement.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment currently known or that which may be later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but the consumer has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software which may include operating systems and applications. The consumer does not manage or control the underlying cloud infrastructure but has control over operating systems, storage, and deployed applications, and the consumer possibly has limited control of select networking components (e.g., host firewalls).

Deployment models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and/or compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
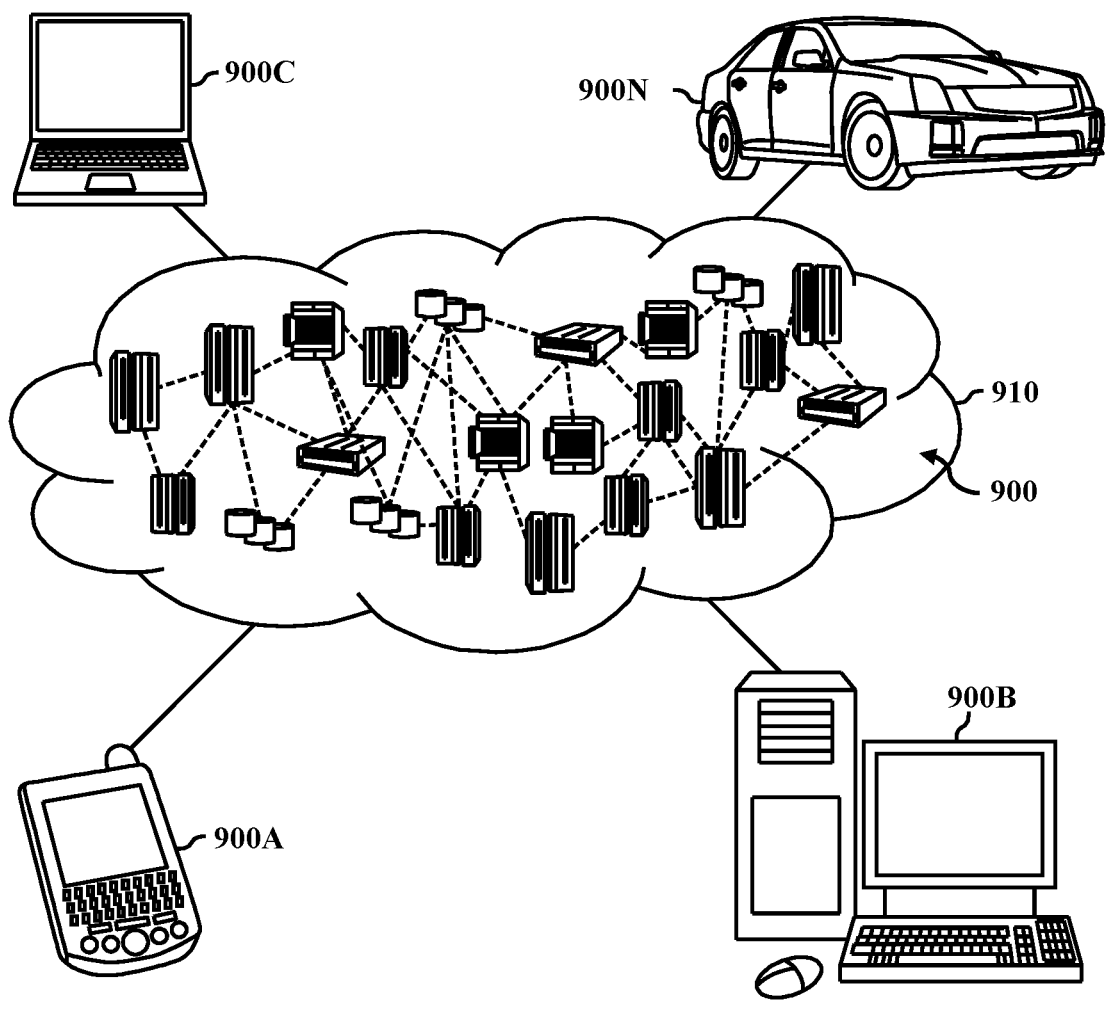
FIG. 9 illustrates a cloud computing environment, in accordance with embodiments of the present disclosure.

FIG. 9 illustrates a cloud computing environment 910 in accordance with embodiments of the present disclosure. As shown, cloud computing environment 910 includes one or more cloud computing nodes 900 with which local computing devices used by cloud consumers such as, for example, personal digital assistant (PDA) or cellular telephone 900A, desktop computer 900B, laptop computer 900C, and/or automobile computer system 900N may communicate. Nodes 900 may communicate with one another. They may be grouped (not shown) physically or virtually, in one or more networks, such as private, community, public, or hybrid clouds as described hereinabove, or a combination thereof.

This allows cloud computing environment 910 to offer infrastructure, platforms, and/or software as services for which a cloud consumer does not need to maintain resources on a local computing device. It is understood that the types of computing devices 900A-N shown in FIG. 9 are intended to be illustrative only and that computing nodes 900 and cloud computing environment 910 can communicate with any type of computerized device over any type of network and/or network addressable connection (e.g., using a web browser).

Figure 10:
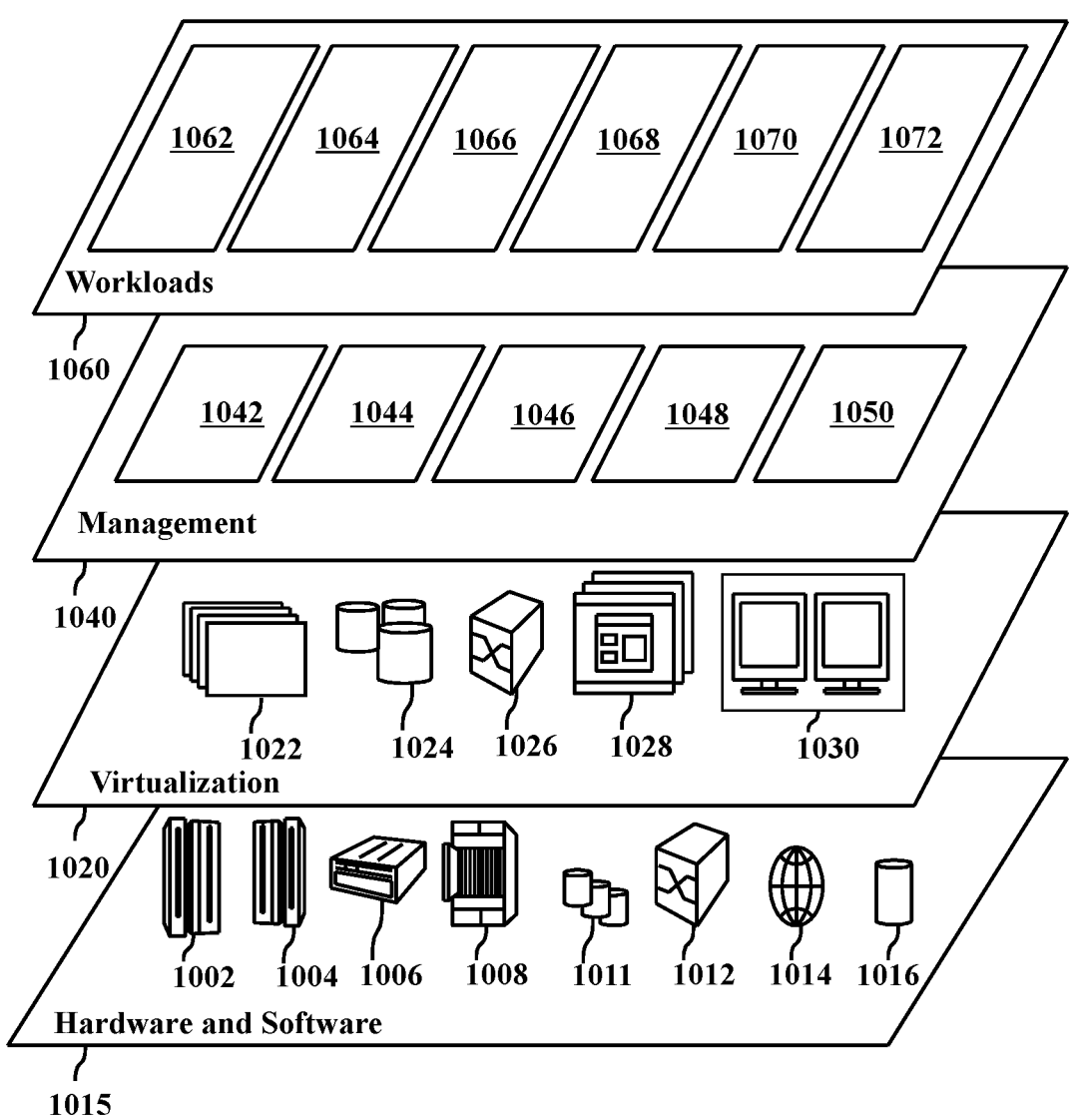
FIG. 10 depicts abstraction model layers, in accordance with embodiments of the present disclosure.

FIG. 10 illustrates abstraction model layers 1000 provided by cloud computing environment 910 (FIG. 9) in accordance with embodiments of the present disclosure. It should be understood in advance that the components, layers, and functions shown in FIG. 10 are intended to be illustrative only and embodiments of the disclosure are not limited thereto. As depicted below, the following layers and corresponding functions are provided.

Hardware and software layer 1015 includes hardware and software components. Examples of hardware components include: mainframes 1002; RISC (Reduced Instruction Set Computer) architecture-based servers 1004; servers 1006; blade servers 1008; storage devices 1011; and networks and networking components 1012. In some embodiments, software components include network application server software 1014 and database software 1016.

Virtualization layer 1020 provides an abstraction layer from which the following examples of virtual entities may be provided: virtual servers 1022; virtual storage 1024;

virtual networks 1026, including virtual private networks; virtual applications and operating systems 1028; and virtual clients 1030.

In one example, management layer 1040 may provide the functions described below. Resource provisioning 1042 provides dynamic procurement of computing resources and other resources that are utilized to perform tasks within the cloud computing environment. Metering and pricing 1044 provide cost tracking as resources and are utilized within the cloud computing environment as well as billing or invoicing for consumption of these resources. In one example, these resources may include application software licenses. Security provides identity verification for cloud consumers and tasks as well as protection for data and other resources. User portal 1046 provides access to the cloud computing environment for consumers and system administrators. Service level management 1048 provides cloud computing resource allocation and management such that required service levels are met. Service level agreement (SLA) planning and fulfillment 1050 provide pre-arrangement for, and procurement of, cloud computing resources for which a future requirement is anticipated in accordance with an SLA.

Workloads layer 1060 provides examples of functionality for which the cloud computing environment may be utilized. Examples of workloads and functions which may be provided from this layer include: mapping and navigation 1062; software development and lifecycle management 1064; virtual classroom education delivery 1066; data analytics processing 1068; transaction processing 1070; and dynamically updated advertisement placements in sequential workflows 1072.

Figure 11:
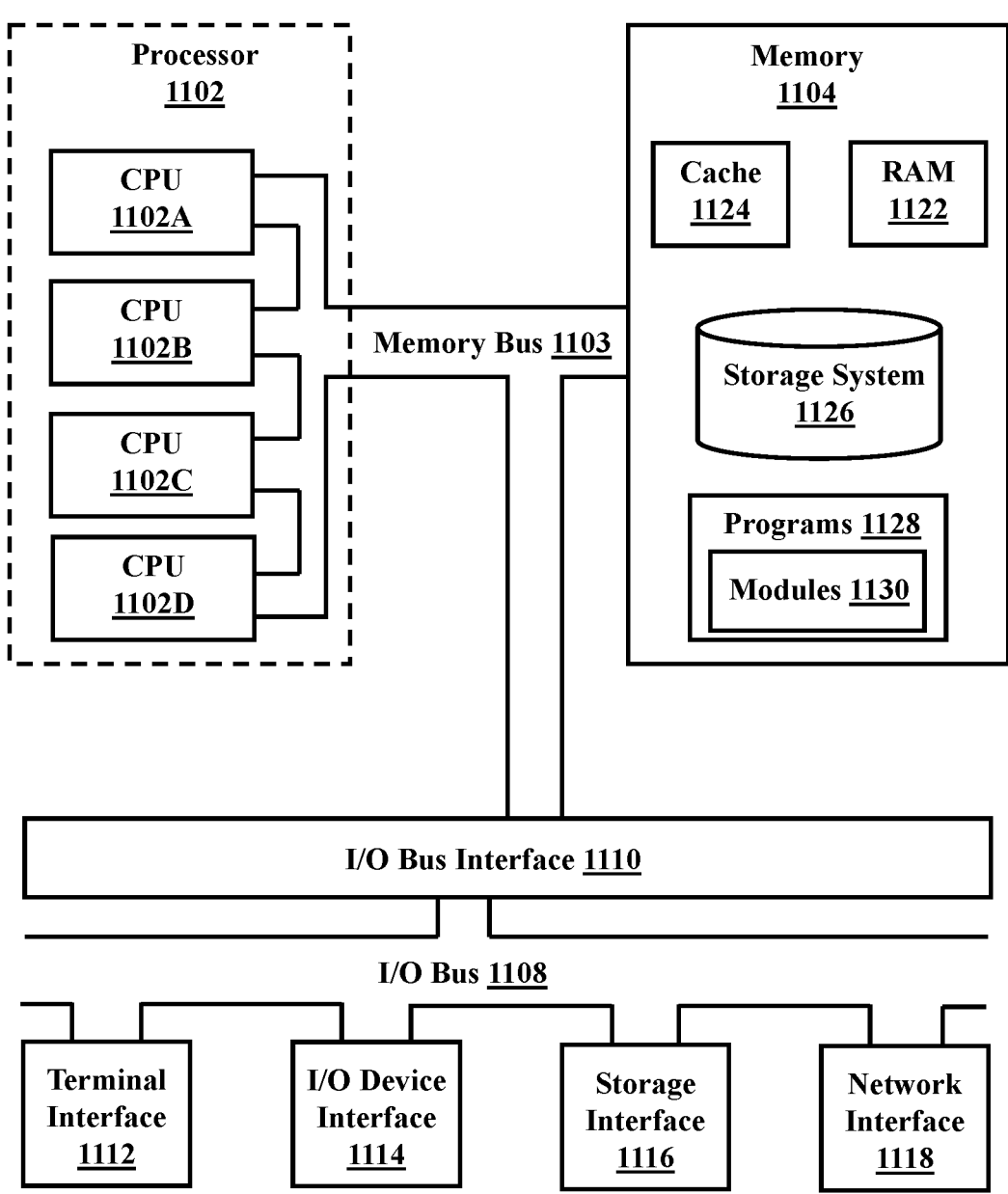
FIG. 11 illustrates a high-level block diagram of an example computer system that may be used in implementing one or more of the methods, tools, and modules, and any related functions, described herein, in accordance with embodiments of the present disclosure.

FIG. 11 illustrates a high-level block diagram of an example computer system 1101 that may be used in implementing one or more of the methods, tools, and modules, and any related functions, described herein (e.g., using one or more processor circuits or computer processors of the computer) in accordance with embodiments of the present disclosure. In some embodiments, the major components of the computer system 1101 may comprise a processor 1102 with one or more central processing units (CPUs) 1102A, 1102B, 1102C, and 1102D, a memory subsystem 1104, a terminal interface 1112, a storage interface 1116, an I/O (Input/Output) device interface 1114, and a network interface 1118, all of which may be communicatively coupled, directly or indirectly, for inter-component communication via a memory bus 1103, an I/O bus 1108, and an I/O bus interface unit 1110.

The computer system 1101 may contain one or more general-purpose programmable CPUs 1102A, 1102B, 1102C, and 1102D, herein generically referred to as the CPU 1102. In some embodiments, the computer system 1101 may contain multiple processors typical of a relatively large system; however, in other embodiments, the computer system 1101 may alternatively be a single CPU system. Each CPU 1102 may execute instructions stored in the memory subsystem 1104 and may include one or more levels of on-board cache.

System memory 1104 may include computer system readable media in the form of volatile memory, such as random access memory (RAM) 1122 or cache memory 1124. Computer system 1101 may further include other removable/non-removable, volatile/non-volatile computer system storage media. By way of example only, storage system 1126 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM, or other optical media can be provided. In addition, memory 1104 can include flash memory, e.g., a flash memory stick drive or a flash drive. Memory devices can be connected to memory bus 1103 by one or more data media interfaces. The memory 1104 may include at least one program product having a set (e.g., at least one) of program modules that are configured to carry out the functions of various embodiments.

One or more programs/utilities 1128, each having at least one set of program modules 1130, may be stored in memory 1104. The programs/utilities 1128 may include a hypervisor (also referred to as a virtual machine monitor), one or more operating systems, one or more application programs, other program modules, and program data. Each of the operating systems, one or more application programs, other program modules, and program data, or some combination thereof, may include an implementation of a networking environment. Programs 1128 and/or program modules 1130 generally perform the functions or methodologies of various embodiments.

Although the memory bus 1103 is shown in FIG. 11 as a single bus structure providing a direct communication path among the CPUs 1102, the memory subsystem 1104, and the I/O bus interface 1110, the memory bus 1103 may, in some embodiments, include multiple different buses or communication paths, which may be arranged in any of various forms, such as point-to-point links in hierarchical, star, or web configurations, multiple hierarchical buses, parallel and redundant paths, or any other appropriate type of configuration. Furthermore, while the I/O bus interface 1110 and the I/O bus 1108 are shown as single respective units, the computer system 1101 may, in some embodiments, contain multiple I/O bus interface units 1110, multiple I/O buses 1108, or both. Further, while multiple I/O interface units 1110 are shown, which separate the I/O bus 1108 from various communications paths running to the various I/O devices, in other embodiments some or all of the I/O devices may be connected directly to one or more system I/O buses 1108.

In some embodiments, the computer system 1101 may be a multi-user mainframe computer system, a single-user system, a server computer, or similar device that has little or no direct user interface but receives requests from other computer systems (clients). Further, in some embodiments, the computer system 1101 may be implemented as a desktop computer, portable computer, laptop or notebook computer, tablet computer, pocket computer, telephone, smartphone, network switches or routers, or any other appropriate type of electronic device.

It is noted that FIG. 11 is intended to depict the representative major components of an exemplary computer system 1101. In some embodiments, however, individual components may have greater or lesser complexity than as represented in FIG. 11, components other than or in addition to those shown in FIG. 11 may be present, and the number, type, and configuration of such components may vary.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide, or other transmission media (e.g., light pulses passing through a fiber-optic cable) or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN) or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although the present disclosure has been described in terms of specific embodiments, it is anticipated that alterations and modifications thereof will become apparent to the skilled in the art. The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or the technical improvement over technologies found in the marketplace or to enable others of ordinary skill in the art to understand the embodiments disclosed herein. Therefore, it is intended that the following claims be interpreted as covering all such alterations and modifications as fall within the true spirit and scope of the disclosure.

What is claimed is:

1. A system comprising:

a memory; and a processor in communication with said memory, said processor being configured to perform operations, said operations comprising:

engaging, by a computer server in network communication with a client device remote from the computer server and executing a navigational user interface on said client device, a user in a primary activity via a network, wherein said primary activity includes a plurality of discrete workflow stages in a sequential order, wherein said user can sequentially progress through said stages to complete said primary activity via user navigation of said navigational user interface of said client device, wherein each stage in said plurality of stages has a stage completion value that dynamically updates as said user navigates through said discrete workflow stages in accordance with said sequential order;

establishing, by a primary entity using a machine learning technique, an initial stage completion value for each stage in said plurality of stages, as well as an initial expected return value for each stage in said plurality of stages;

modeling, by a machine learning model, an effect of an advertisement placement on each of said discrete workflow stages while said user is engaged in said primary activity via said navigational user interface, wherein said effect on each of said workflow stages includes a projected impact of said advertisement placement on a likelihood of said user completing said primary activity via said navigational user interface;

detecting, by said computer server in network communication with said client device, a navigational advancement of said user sequentially advancing from one stage of said plurality of stages to another stage that is subsequent to said one stage as defined in said sequential order;

updating, by said computer server, a number of placement opportunities to be displayed among said plurality of discrete workflow stages by said navigational user interface of said user;

retraining, by said computer server, said machine learning model to generate a retrained machine learning model, wherein said retraining is based on said navigational advancement of said user and said updated number of placement opportunities;

determining, by said retrained machine learning model utilizing both said navigational advancement of said user and said updated number, a navigational effect of making said advertisement placement on at least one of said plurality of stages while said user remains engaged in said primary activity with said client device, said navigational effect including an updated stage completion value for each stage in said plurality of stages, and said navigational effect including an updated expected return value for each stage in said plurality of stages;

determining, by said computer server, a risk-reward score for each stage in said plurality of stages based on said navigational effect of making said advertisement placement of an advertisement within at least one of said plurality of stages, wherein said risk-reward score is calculated based on (1) said initial stage completion value for each stage in said plurality of stages, (2) said updated stage completion value for each stage in said plurality of stages, (3) said initial expected return value for each stage in said plurality of stages, and (4) said updated expected return value for each stage in said plurality of discrete workflow stages;

updating, dynamically, said risk-reward score when said user performs an action;

generating, dynamically as said user engages in said primary activity, a threshold for a stage in said plurality of stages;

identifying, by said computer server via said retrained machine learning model, a recommended stage for said advertisement, wherein said recommended stage is selected from said plurality of discrete workflow stages having a corresponding said risk-reward score and said threshold for said stage in said plurality of discrete workflow stages;

displaying, by said client device based on said recommended stage identified by said computer server, said advertisement on said navigational user interface to said user at said recommended stage;

determining, by said client device, contextual information regarding interaction by said user with said advertisement while said user is engaging in said primary activity; and updating, by said computer server, said retrained machine learning model based on said contextual information determined by said computer server.

2. The system of claim 1, said operations further comprising:

updating, dynamically, said risk-reward score based on activity of said user.

3. The system of claim 2, wherein:

said activity includes data concerning interactions of said user with said advertisement.

4. The system of claim 1, said operations further comprising:

achieving said threshold for said risk-reward score; and establishing said threshold on a per-stage basis, wherein said per-stage basis is relative to each of said plurality of stages.

5. The system of claim 1, said operations further comprising:

generating said stage completion value, wherein said stage completion value reflects contextual factors.

6. The system of claim 1, said operations further comprising:

generating an advancement probability for each of said risk-reward score, wherein said advancement probability identifies an impact of said advertisement placement on a likelihood of said user completing said primary activity.

7. The system of claim 1, said operations further comprising:

quantifying said risk-reward score with a machine learning tool; and training said machine learning tool with a database containing historical data of primary activity user engagement.

8. A computer-implemented method comprising:

engaging, by a computer server in network communication with a client device remote from the computer server and executing a navigational user interface on said client device, a user in a primary activity via a network, wherein said primary activity includes a plurality of discrete workflow stages in a sequential order, wherein said user can sequentially progress through said stages to complete said primary activity via user navigation of said navigational user interface of said client device, wherein each stage in said plurality of stages has a stage completion value that dynamically updates as said user navigates through said discrete workflow stages in accordance with said sequential order;

establishing, by a primary entity using a machine learning technique, an initial stage completion value for each stage in said plurality of stages, as well as an initial expected return value for each stage in said plurality of stages;

modeling, by a machine learning model, an effect of an advertisement placement on each of said discrete workflow stages while said user is engaged in said primary activity via said navigational user interface, wherein said effect on each of said workflow stages includes a projected impact of said advertisement placement on a likelihood of said user completing said primary activity via said navigational user interface;

detecting, by said computer server in network communication with said client device, a navigational advancement of said user sequentially advancing from one stage of said plurality of stages to another stage that is subsequent to said one stage as defined in said sequential order;

updating, by said computer server, a number of placement opportunities to be displayed among said plurality of discrete workflow stages by said navigational user interface of said user;

retraining, by said computer server, said machine learning model to generate a retrained machine learning model, wherein said retraining is based on said navigational advancement of said user and said updated number of placement opportunities;

determining, by said retrained machine learning model utilizing both said navigational advancement of said user and said updated number, a navigational effect of making said advertisement placement on at least one of said plurality of stages while said user remains engaged in said primary activity with said client device, said navigational effect including an updated stage completion value for each stage in said plurality of stages, and said navigational effect including an updated expected return value for each stage in said plurality of stages;

determining, by said computer server, a risk-reward score for each stage in said plurality of stages based on said navigational effect of making said advertisement placement of an advertisement within at least one of said plurality of stages, wherein said risk-reward score is calculated based on (1) said initial stage completion value for each stage in said plurality of stages, (2) said updated stage completion value for each stage in said plurality of stages, (3) said initial expected return value for each stage in said plurality of stages, and (4) said updated expected return value for each stage in said plurality of discrete workflow stages;

updating, dynamically, said risk-reward score when said user performs an action;

generating, dynamically as said user engages in said primary activity, a threshold for a stage in said plurality of stages;

identifying, by said computer server via said retrained machine learning model, a recommended stage for said advertisement, wherein said recommended stage is selected from said plurality of discrete workflow stages having a corresponding said risk-reward score and said threshold for said stage in said plurality of discrete workflow stages;

displaying, by said client device based on said recommended stage identified by said computer server, said advertisement on said navigational user interface to said user at said recommended stage;

determining, by said client device, contextual information regarding interaction by said user with said advertisement while said user is engaging in said primary activity; and updating, by said computer server, said retrained machine learning model based on said contextual information determined by said computer server.

9. The computer-implemented method of claim 8, further comprising:

updating, dynamically, said risk-reward score based on activity of said user.

10. The computer-implemented method of claim 9, wherein:

said activity includes data concerning interactions of said user with said advertisement.

11. The computer-implemented method of claim 8, further comprising:

achieving said threshold for said risk-reward score; and establishing said threshold on a per-stage basis, wherein said per-stage basis is relative to each of said plurality of stages.

12. The computer-implemented method of claim 8, further comprising:

generating said stage completion value, wherein said stage completion value reflects contextual factors.

13. The computer-implemented method of claim 8, further comprising:

generating an advancement probability for each of said risk-reward score, wherein said advancement probability identifies an impact of said advertisement placement on a likelihood of said user completing said primary activity.

14. The computer-implemented method of claim 8, further comprising:

quantifying said risk-reward score with a machine learning tool; and training said machine learning tool with a database containing historical data of primary activity user engagement.

15. A non-transitory computer program product, said computer program product comprising a non-transitory computer readable storage medium having program instructions embodied therewith, said program instructions executable by a processor to cause said processor to perform a function, said function comprising:

engaging, by a computer server in network communication with a client device remote from the computer server and executing a navigational user interface on said client device, a user in a primary activity via a network, wherein said primary activity includes a plurality of discrete workflow stages in a sequential order, wherein said user can sequentially progress through said stages to complete said primary activity via user navigation of said navigational user interface of said client device, wherein each stage in said plurality of stages has a stage completion value that dynamically updates as said user navigates through said discrete workflow stages in accordance with said sequential order;

establishing, by a primary entity using a machine learning technique, an initial stage completion value for each stage in said plurality of stages, as well as an initial expected return value for each stage in said plurality of stages;

modeling, by a machine learning model, an effect of an advertisement placement on each of said discrete workflow stages while said user is engaged in said primary activity via said navigational user interface, wherein said effect on each of said workflow stages includes a projected impact of said advertisement placement on a likelihood of said user completing said primary activity via said navigational user interface;

detecting, by said computer server in network communication with said client device, a navigational advancement of said user sequentially advancing from one stage of said plurality of stages to another stage that is subsequent to said one stage as defined in said sequential order;

updating, by said computer server, a number of placement opportunities to be displayed among said plurality of discrete workflow stages by said navigational user interface of said user;

retraining, by said computer server, said machine learning model to generate a retrained machine learning model, wherein said retraining is based on said navigational advancement of said user and said updated number of placement opportunities;

determining, by said retrained machine learning model utilizing both said navigational advancement of said user and said updated number, a navigational effect of making said advertisement placement on at least one of said plurality of stages while said user remains engaged in said primary activity with said client device, said navigational effect including an updated stage completion value for each stage in said plurality of stages, and said navigational effect including an updated expected return value for each stage in said plurality of stages;

determining, by said computer server, a risk-reward score for each stage in said plurality of stages based on said navigational effect of making said advertisement placement of an advertisement within at least one of said plurality of stages, wherein said risk-reward score is calculated based on (1) said initial stage completion value for each stage in said plurality of stages, (2) said updated stage completion value for each stage in said plurality of stages, (3) said initial expected return value for each stage in said plurality of stages, and (4) said updated expected return value for each stage in said plurality of discrete workflow stages;

updating, dynamically, said risk-reward score when said user performs an action;

generating, dynamically as said user engages in said primary activity, a threshold for a stage in said plurality of stages;

identifying, by said computer server via said retrained machine learning model, a recommended stage for said advertisement, wherein said recommended stage is selected from said plurality of discrete workflow stages having a corresponding said risk-reward score and said threshold for said stage in said plurality of discrete workflow stages;

displaying, by said client device based on said recommended stage identified by said computer server, said advertisement on said navigational user interface to said user at said recommended stage;

determining, by said client device, contextual information regarding interaction by said user with said advertisement while said user is engaging in said primary activity; and updating, by said computer server, said retrained machine learning model based on said contextual information determined by said computer server.

16. The computer program product of claim 15, said function further comprising:

updating, dynamically, said risk-reward score based on activity of said user, wherein said activity includes data concerning interactions of said user with said advertisement.

17. The computer program product of claim 15, said function further comprising:

achieving said threshold for said risk-reward score; and establishing said threshold on a per-stage basis, wherein said per-stage basis is relative to each of said plurality of stages.

18. The computer program product of claim 15, said function further comprising:

generating said stage completion value, wherein said stage completion value reflects contextual factors.

19. The computer program product of claim 15, said function further comprising:

generating an advancement probability for each of said risk-reward score, wherein said advancement probability identifies an impact of said advertisement placement on a likelihood of said user completing said primary activity.

20. The computer program product of claim 15, said function further comprising:

quantifying said risk-reward score with a machine learning tool; and training said machine learning tool with a database containing historical data of primary activity user engagement.

* * * * *